United States Patent [19]

Bonk et al.

[11] 4,098,772

[45] Jul. 4, 1978

[54] THERMOPLASTIC POLYURETHANES PREPARED WITH SMALL AMOUNTS OF MONOHYDRIC ALCOHOLS

[75] Inventors: Henry W. Bonk, Wallingford; Benjamin S. Ehrlich, Cheshire; Joseph Pleckaitis, North Haven, all of Conn.

[73] Assignee: The Upjohn Company, Kalamazoo, Mich.

[21] Appl. No.: 666,088

[22] Filed: Mar. 11, 1976

[51] Int. Cl.$^2$ ............... C08G 18/30; C08G 18/76
[52] U.S. Cl. ............... 528/49; 264/176 R; 264/DIG. 77; 528/76
[58] Field of Search ............... 260/2.5 AM, 77.5 MA, 260/2.5 AD, 77.5 AA, 77.5 A, 75 NP

[56] References Cited

U.S. PATENT DOCUMENTS

| 3,178,300 | 4/1965 | Gemeinhardt et al. | 260/2.5 AM |
| 3,294,713 | 12/1966 | Hudson et al. | 260/2.5 AM |
| 3,405,077 | 10/1968 | Pastor et al. | 260/2.5 AM |
| 3,641,199 | 2/1972 | Niederhauser et al. | 260/859 R |
| 3,875,086 | 4/1975 | Ramey et al. | 260/77.5 MA |

FOREIGN PATENT DOCUMENTS 2,418,075   10/1975   Fed. Rep. of Germany.

*Primary Examiner*—H.S. Cockeram
*Attorney, Agent, or Firm*—Denis A. Firth; John Kekich

[57] ABSTRACT

The processing temperatures of thermoplastic polyurethane elastomers are reduced, and the extrudability and the sensitivity to degradation by shear and by moisture are improved, by including a minute proportion (from 0.0005 to 0.05 equivalents, per equivalent of isocyanate) of a monohydric aliphatic alcohol in the reaction mixture (diisocyanate, polymeric diol and difunctional extender) employed to prepare thermoplastic polyurethane elastomers by the one-shot procedure.

8 Claims, No Drawings

THERMOPLASTIC POLYURETHANES PREPARED WITH SMALL AMOUNTS OF MONOHYDRIC ALCOHOLS

BACKGROUND OF THE INVENTION

1. Field of the Invention

This invention relates to polyurethane elastomers and to their preparation and is more particularly concerned with polyurethane elastomers derived from modified bis(phenyl isocyanate) and with processes for their preparation.

2. Description of the Prior Art

A wide range of thermoplastic non-cellular polyurethanes is currently available for use in the preparation of articles by injection molding, extrusion and like techniques. These elastomers are generally prepared by the reaction of an organic diisocyanate, a polymeric diol, and a difunctional extender. They require care both in the processes used for their manufacture and in the molding processes to which they are subjected in producing fabricated articles. Thus, the materials in question are subject to degradation upon exposure to high temperature for excessive periods during manufacture or processing. In addition, they are extremely sensitive, at the elevated temperatures employed in manufacture and/or processing, to reaction with atmospheric moisture with subsequent undesirable effects on physical properties. The sensitivity to moisture is increased in direct proportion to the temperature to which the polymer is exposed during manufacture and processing. It is accordingly desirable to develop methods for reducing or minimizing these problems.

It is an object of this invention to provide polyurethane elastomers which can be processed, by molding, extrusion and the like, at temperatures lower than those hitherto employed thereby reducing sensitivity to degration by heat and by atmospheric moisture.

It is a further object to reduce the melt temperature of said polyurethane elastomers without significantly affecting the desirable physical properties of said elastomers.

It is a further object to reduce the energy requirements for carrying out the preparation of the said polyurethane elastomers.

These objectives are achieved by adding a trace of a monohydric aliphatic alcohol to the reaction mixture employed in the preparation of said elastomers by a one-shot process.

The use of such monohydric alcohols, commonly referred to in the art as chain terminators, for other purposes is well-known. For example, such monohydric alcohols have been employed (U.S. Pat. No. 3,350,361) in the preparation of isocyanate-terminated prepolymers to be used in coating of leather to give increased break and scuff resistance to the latter. Monohydric alcohols have also been employed in the making of isocyanate-terminated prepolymers which are then reacted with extenders in the presence of solvent for the preparation of spinnable solutions of polyurethane; see U.S. Pat. No. 3,384,623. Polyurethane elastomers have been prepared by reacting isocyanate-terminated prepolymers with diamine, hydrazide or hydrazine extenders, and monohydric alcohols have been used to terminate the reaction; see U.S. Pat. No. 3,483,167. Moisture curable polyurethane coating compositions containing free isocyanate groups have been obtained by reacting a substantial excess of a diisocyanate, a polyol containing some triol, and a monohydric alcohol in the presence of solvent; see U.S. Pat. No. 3,425,973. Monohydric alcohols have been used to terminate the reaction of a diisocyanate, polycaprolactone diol and alkanediol extender (see U.S. Pat. No. 3,761,439) and also to terminate the reaction, in dimethylformamide, or methylenebis(phenyl isocyanate) and a polymeric diol (see U.S. Pat. No. 3,823,111). U.S. Pat. No. 3,272,098 describes the use of monofunctional alcohol in the control of hardness in a clay filled polyurethane elastomer to be used in paving. U.S. Pat. No. 3,875,086 describes what is said to be an improvement over the latter process in that a high equivalent weight (500–2800) monohydroxy polyether is used in place of the lower molecular weight monohydric alcohols.

To the best of our knowledge it has not previously been suggested that a minute amount of a monohydric aliphatic alcohol be included in the one-shot reaction of a diisocyanate, polymeric diol and difunctional extender to prepare a thermoplastic polyurethane and it has not been suggested that such a device would give the highly useful results which are discussed hereinbelow and would achieve the objectives discussed above.

SUMMARY OF THE INVENTION

The invention comprises an improved thermoplastic polyurethane elastomer which is the product of a one-shot reaction of an organic diisocyanate, a polymeric diol and a difunctional extender and wherein the improvement comprises incorporating into the reaction mixture used to prepare said elastomer from about 0.0005 to about 0.05 equivalents, per equivalent of said diisocyanate, of a monohydric aliphatic alcohol having from 1 to 18 carbon atoms, inclusive.

DETAILED DESCRIPTION OF THE INVENTION

The polyurethane elastomers of the invention are prepared by processes conventional in the art for the one-shot synthesis (i.e. the process in which all the reactants are brought together without any prereaction between two or more components) of polyurethane elastomers, the novel feature being the inclusion of the monohydric aliphatic alcohol in the reaction mixture. In a preferred embodiment, the elastomeric polyurethanes of the invention are prepared by a continuous one-shot procedure such as that set forth in U.S. Pat. No. 3,642,964.

The monohydric aliphatic alcohols which are employed in preparing the polyurethane elastomers of the invention are inclusive of primary and secondary alkanols, mono- and poly-alkoxyalkanols, alkenols, and cycloaliphatic alcohols all of which preferably have a carbon atom content within the range of 1 to 18. Illustrative of alkanols are n-butyl alcohol, sec-butyl alcohol, pentyl alcohol, 1-hexanol, 2-hexanol, octanol-2, octanol-1, nonyl alcohol, decanol-1, decanol-3, undecyl alcohol, dodecyl alcohol, pentadecyl alcohol, hexadecyl alcohol, octadecyl alcohol, and the like. Illustrative of mono- and poly-alkoxyalkanols are the ethyl, butyl, hexyl, octyl, decyl, and like alkyl monoethers of ethylene glycol, 1,3-propylene glycol, 1,4-butanediol, 1,2-hexanediol, diethylene glycol, dipropylene glycol, tripropylene glycol, and the like. Illustrative of cycloaliphatic alcohols are cyclobutanol, cyclopentanol, cyclohexanol, cycloheptanol, 1-methylcyclohexan-2-ol, and the like.

Illustrative of alkenols are vinyl alcohol, allyl alcohol, methacrylyl alcohol, butenyl alcohol, hexenyl alcohol, octenyl alcohol, dodecenyl alcohol, pentadecenyl alcohol, octadecenyl alcohol, and the like.

Preferred monohydric aliphatic alcohols are the alkanols and the mono- and poly-alkoxyalkanols. Particularly preferred species are n-butyl alcohol, dodecyl alcohol and the monobutyl ether of diethylene glycol (commonly referred to as butyl carbitol).

In preparing the polyurethane elastomers of the invention there can be employed any of the polymeric diols and extenders conventionally employed in the art for the preparation of such elastomers. The polymeric diols advantageously have molecular weights in the range of 400 to 4000 and preferably within the range of about 500 to about 3000. Illustrative of polymeric diols are polyester diols and polyether diols having molecular weights within the above range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxylterminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition the above type of polyester diols, there can also be used the polycaprolactone diols which are prepared by polymerizing the appropriate caprolactone with the appropriate difunctional initiator, such as an aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of δ-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol, 1,4-butanediol, 2,3-butanediol, 1,5-pentanediol, 1,2-hexanediol, diethanolamine, resorcinol, catechol, bis(p-hydroxyphenyl)methane, diethylene glycol, dipropylene glycol, and the like.

The extenders which are employed in preparing the polyurethane elastomers of the invention can be any of the difunctional active hydrogen containing extenders commonly employed in the art. The latter are inclusive of glycols, diamines, amino alcohols, and the like. Illustrative of diol extenders are aliphatic diols, advantageously containing from 2 to 6 carbon atoms, inclusive, such as ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether thereof. Illustrative of diamine extenders are aromatic diamines such as p-phenylenediamine, m-phenylenediamine, benzidine, 4,4'-methylenedianiline, 4,4'-methylenebis(2-chloroaniline) and the like. Illustrative of amino alcohols are ethanolamine, propanolamine, butanolamine, and the like.

As set forth above, the polyurethane elastomers of the invention are made by the one-shot procedure and preferably by a continuous one-shot procedure. In such procedures the reactants are brought together in any order and in separate or preblended streams. Advantageously, the polyols, i.e. the polymeric diol, the extender, and the monohydric alcohol are preblended and fed to the reaction mixture as a single component, the other major component being the diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C) and the resulting mixutre is then heated to a temperature of the order of about 40° to about 130° C, preferably to a temperature of about 90° to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° to about 115° C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960. Such catalysts include organic and inorganic acid salts of, and organometallic derivatives of, bismuth, lead, tin, iron, antimony, uranium, cadmium, cobalt, thorium aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylquanidine, N,N,N',N'-tetramethyl-1,3-butanediamine, N,N-dimethlethanolamine, N,N-diethylethanolamine, and the like. The amount of catalyst employed is generally within the range of about 0.02 to about 2.0 percent by weight based on the total weight of the reactants.

In carrying out the above-described one-shot reaction, the various reactants are employed in such proportions that the ratio of isocyanate groups to the total number of hydroxyl groups or other active hydrogen containing groups in the polymeric diol, difunctional extender and monohydric aliphatic alcohol is within the range of 0.95:1 to 1.10:1 and, preferably, within the range of 0.98:1 to 1.04:1. Further, as will be appreciated by one skilled in the art, the proportion of polymeric diol to extender can be varied over a wide range depending largely upon the desired hardness of the final polyurethane elastomer. Advantageously, the molar proportion of polymeric diol to extender is within the range of 0.05:1 to 2:1 and preferably within the range of 0.1:1 to 1:1.

As set forth above, the proportion, by equivalents, of monohydric aliphatic alcohol to diisocyanate in the reaction mixture employed to prepare the polyurethane elastomers of the invention, is advantageously in the range of 0.0005:1 to 0.05:1. Preferably the proportion, by equivalents, of said alcohol to diisocyanate is within the range of 0.001:1 to 0.01:1.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The polyurethane elastomers of the invention are characterized by improved properties, particularly in regard to their behaviour on fabrication by injection molding or extrusion, as compared with corresponding polyurethane elastomers prepared in exactly the same manner but in the absence of the monohydric aliphatic alcohol. Thus, the polyurethane elastomers of the invention possess significantly lower melt viscosity than do the corresponding polyurethane elastomers prepared in the absence of the monohydric aliphatic alcohol. This lowered melt viscosity enables the polyurethane elastomers of the invention to be molded, by injection molding or extrusion, at lower temperatures and with much greater facility. Further, we have found that the polymers of the invention show much less tendency to degrade under shear forces applied in the above molding techniques. The polymers of the invention are also much less sensitive to degradation by reaction with atmospheric moisture during processing than are the polymers which correspond in all respects thereto except that no monohydric alcohol is employed in their preparation. The above differences are illustrated by the data set forth in the examples which follow. It is worthy of note that the above improvements in behaviour of the polyurethane elastomers of the invention are not accompanied by any decrease in the desirable physical properties of the elastomers.

An additional unexpected advantage has been found in that the reaction mixture employed in the preparation of the polyurethane elastomers requires significantly less mechanical energy to achieve adequate mixing than does a corresponding reaction mixture which lacks the presence of the monohydric alcohol. This is particularly evident when the polyurethane elastomers of the invention are prepared using continuous procedures such as that set in the aforesaid U.S. Pat. No. 3,642,964.

The following examples describe the manner and process of making and using the invention and set forth the best mode contemplated by the inventors of carrying out the invention but are not to be construed as limiting.

EXAMPLE 1

A series of four elastomers was prepared using the reactants and proportions (all proportions expressed as equivalents except where stated) set forth in Table I below. In the case of Elastomer A (a control elastomer not within the scope of the present invention) no monohydric alcohol was employed in the formulation, but in the case of Elastomers B, C and D (all within the scope of the present invention) a minor amount of lauryl alcohol was incorporated in the polyol side of the formulation.

The procedure employed in the preparation of the elastomers was the same in all cases and was as follows. The polytetramethylene glycol was degassed by heating at 110° C under reduced pressure for 30 minutes. The butanediol, lauryl alcohol (where used), antioxidant and lubricant were added to the tetramethylene glycol and the resulting mixture was again degassed at 110° C under reduced pressure. To the resulting product was added the stannous octoate catalyst and the diisocyanate. The mixture so obtained was subjected to high speed mechanical stirring for 15 seconds and then poured into a shallow aluminum tray. The poured elastomer and tray were allowed to stand at room temperature (circa 20° C) for 24 hours. Thereafter the elastomer was chopped and then granulated and dried for 3 hours at 100° C. A test piece (a sheet 4.5 × 4.5 × 1/16 inches) was made from each elastomer by injection molding and submitted to physical testing. The properties so determined are summarized in Table I.

TABLE I

| Elastomers | A | B | C | D |
|---|---|---|---|---|
| 4,4'-methylenebis(phenyl isocyanate (equivs.) | 2.3 | 2.35 | 2.323 | 2.323 |
| polytetramethylene glycol (MW = 1000) (equivs.) | 1.0 | 1.0 | 1.0 | 1.0 |
| 1,4-butanediol (equivs.) | 1.3 | 1.3 | 1.3 | 1.3 |
| lauryl alcohol (equivs.) | — | 0.046 | 0.023 | 0.023 |
| antioxidant (hindered phenol): % w/w | 0.5 | 0.5 | 0.5 | 0.5 |
| lubricant (amide wax): % w/w | 0.4 | 0.4 | 0.4 | 0.4 |
| stannous octoate: % w/w | 0.03 | 0.03 | 0.03 | 0.03 |
| NCO/OH | 1.01 | 1.025 | 1.01 | 1.03 |
| Physical Properties | | | | |
| Tensile strength psi | 5940 | 4010 | 5280 | 5600 |
| Tensile modulus psi | | | | |
| at 50% | 620 | 480 | 830 | 820 |
| 100% | 900 | 740 | 980 | 970 |
| 300% | 1730 | 1320 | 1540 | 1620 |
| Elongation % | 570 | 780 | 600 | 570 |
| Tensile set % | 30 | 100 | 50 | 40 |
| Hardness, Shore A | 82 | 82 | 83 | 83 |

A sample of each of Elastomers A, B, C and D was submitted to melt viscosity studies using a standard Monsanto Capillary Extrusion Rheometer employing an extrusion pressure of 90 psi and a 15/1 length/diameter orifice. It was found that the standard volume of Elastomer B could be extruded at 350° F in 0.175 minutes, the standard volumes of Elastomer C was extruded at 370° F in 0.155 minutes and the standard volume of Elastomer D was extruded at 360° F in only 0.13 minutes. In marked contrast, it required 0.22 minutes t extrude the standard volume of Elastomer A even at 400° F. This data illustrates the significant depression of melt viscosity achieved by using the lauryl alcohol in Elastomers B, C and D.

EXAMPLE 2

A series of three elastomers was prepared using the procedure described in Example 1 and employing the reactants and proportions set forth in Table II. Test sheets of the elastomers were prepared by injection molding as described in Example 1 and the physical properties determined on these test sheets are also recorded in Table II. The melt viscosities of the three elastomers were determined using the Tinius Olson test conditions (ASTM D-1238) using an 1100 g. weight on the piston and a temperature of 224° C. The times recorded (in seconds) are those required to extrude 1 inch of elastomer under the conditions used. It was found that, in order to achieve a comparable extrusion time (65 seconds) in respect of an elastomer prepared using the same formulation as Elastomers E, F and G but without inclusion of the butyl Carbitol (monobutyl ether of diethylene glycol) it was necessary to employ a weight of 2060 g. on the piston.

TABLE II

| Elastomers | E | F | G |
|---|---|---|---|
| 4,4'-methylenebis(phenyl isocyanate) (equivs.) | 3.0183 | 3.063 | 3.109 |
| polytetramethylene glycol (MW = 1000) (equivs.) | 1.0 | 1.0 | 1.0 |
| 1,4-butanediol (equivs.) | 2.0 | 2.0 | 2.0 |
| butyl Carbitol (equivs.) | 0.0183 | 0.0183 | 0.0183 |
| antioxidant (hindered phenol): % w/w | 0.6 | 0.6 | 0.6 |
| lubricant (amide wax): % w/w | 0.15 | 0.15 | 0.15 |
| stannous octoate: % w/w | 0.03 | 0.03 | 0.03 |
| NCO/OH | 1.0 | 1.015 | 1.03 |

| Physical Properties | | | |
|---|---|---|---|
| Tensile psi | 7050 | 7530 | 7210 |
| Tensile modulus psi | | | |
| at 50% | 910 | 940 | 1020 |
| 100% | 1240 | 1270 | 1300 |
| 200% | 1880 | 1410 | 2000 |
| 300% | 2860 | 2890 | 3140 |
| Elongation % | 500 | 510 | 490 |
| Tensile set % | 20 | 20 | 20 |
| Compression set % | 34.1 | 27.5 | 34.5 |
| Shore D Hardness | 37 | 38 | 39 |
| Melt viscosity- Tinius Olson (secs.) | 61.7 | 62.3 | — |

EXAMPLE 3

A series of three elastomers (H, J, K) was prepared, using the procedure described in Example 1 but employing the reactants and proportions set forth in Table III below. Elastomer H was a control elastomer which contained no monohydric alcohol whereas Elastomers J and K both employed butyl Carbitol as the monohydric alcohol in accordance with the invention. Test sheets of each elastomer were prepared by injection molding as described in Example 1 and the physical properties determined on these test sheets are also recorded in Table III. The melt viscosities of the three elastomers were determined using the Tinius Olson test conditions employing a 2060 g. weight on the piston and a temperature of 224° C. The times recorded are those required to extrude 1 inch of test elastomer. It will be seen that control Elastomer H required more than twice as long a period to extrude 1 inch of material than did Elastomers J and K, indicating the markedly lower melt viscosity of the latter. This lowering of melt viscosity was achieved without any lowering of the other physical properties of these elastomers.

TABLE III

| Elastomers | H | J | K |
|---|---|---|---|
| 4,4'-methylenebis(phenyl isocyanate) (equivs.) | 3.315 | 3.303 | 3.048 |
| polytetramethylene glycol (MW = 1000) (equivs.) | 1.0 | 1.0 | 1.0 |
| 1,4-butanediol (equivs.) | 2.25 | 2.25 | 2.0 |
| butyl Carbitol (equivs.) | — | 0.02 | 0.018 |
| antioxidant (hindered phenol): % w/w | 0.25 | 0.25 | 0.25 |
| lubricant (amide wax): % w/w | 0.25 | 0.15 | 0.15 |
| stannous octoate: % w/w | 0.05 | 0.05 | 0.05 |
| NCO/OH | 1.02 | 1.01 | 1.01 |

| Physical Properties | | | |
|---|---|---|---|
| Tensile psi | 6070 | 6460 | 6025 |
| Tensile modulus psi | | | |
| at 50% | 1190 | 1400 | 1443 |
| 100% | 1840 | 1760 | 1760 |
| 200% | 4345 | 4060 | 3661 |
| Elongation % | 395 | 400 | 420 |
| Tensile set % | 25 | 20 | 25 |
| Shore A Hardness | 92 | 92 | 92 |
| Tinius Olson Melt index, secs. | 65.8 | 31.0 | 27.4 |

EXAMPLE 4

A series of three elastomers (L, M and N), all within the scope of the present invention, were prepared using the procedure described in Example 1 but using the reactants and proportions set forth in Table IV below. Test sheets of each elastomer were prepared by injection molding as described in Example 1 and the physical properties determined on these test sheets are also recorded in Table IV.

TABLE IV

| Elastomers | L | M | N |
|---|---|---|---|
| 4,4'-methylenebis(phenyl isocyanate) (equivs.) | 7.594 | 4.314 | 4.293 |
| [1]polyether polyol (MW = 2000) (equivs.) | 1.0 | 1.0 | 1.0 |
| polyethylene glycol (MW = 400) (equivs.) | 0.3 | — | — |
| 1,4-butanediol (equivs.) | 6.0 | 3.25 | 3.25 |
| stearyl alcohol (equivs.) | 0.073 | — | — |
| dodecanol (equivs.) | — | 0.064 | 0.0425 |
| antioxidant (hindered phenol): % w/w | 0.3 | 0.5 | 0.5 |
| lubricant (amide wax): % w/w | 0.15 | 0.4 | 0.4 |
| stannous octoate: % w/w | 0.03 | 0.03 | 0.03 |
| NCO/OH | 1.03 | 1.025 | 1.025 |

Footnote:
[1]Polyethylene/polypropylene glycol block copolymer.

| Physical Properties | | | |
|---|---|---|---|
| Tensile psi | 6400 | 4040 | 4745 |
| Tensile modulus psi | | | |
| at 50% | 1330 | 680 | 640 |
| 100% | 1570 | 830 | 800 |
| 200% | — | 1045 | 1045 |
| 300% | 2800 | 1350 | 1405 |
| Tensile set % | 95 | 120 | 85 |

-continued

| Physical Properties | | | |
|---|---|---|---|
| Elongation % | 580 | 700 | 670 |
| Compression set % | 27 | — | — |
| Shore A Hardness | 50 | — | — |
| Tinius Olson Melt index secs./in. at 224° C; 2060 g. weight | 16.5 | — | — |

We claim:

1. A thermoplastic polyurethane elastomer which is the product of a one-shot reaction of an organic diisocyanate, a polymeric diol, a difunctional extender and from 0.0005 equivalents to 0.05 equivalents, per equivalent of said diisocyanate, of a monohydric alcohol selected from the class consisting of dodecyl alcohol, stearyl alcohol, and the monobutyl ether of diethylene glycol.

2. A thermoplastic polyurethane elastomer according to claim 1 wherein the overall ratio of equivalents of isocyanate to equivalents of active hydrogen containing materials is within the range of 0.95:1 to 1.10:1.

3. A thermoplastic polyurethane elastomer according to claim 1 wherein the amount of monohydric alcohol employed is within the range of 0.001 to 0.01 equivalents, per equivalent of diisocyanate.

4. A thermoplastic polyurethane elastomer according to claim 1 wherein the amount of monohydric alcohol employed is within the range of 0.001 to 0.01 equivalents per equivalent of diisocyanate.

5. A thermoplastic polyurethane elastomer which is the product of a one-shot reaction of:
   (a) 4,4'-methylenebis(phenyl isocyanate);
   (b) a polymeric diol having a molecular weight in the range of 500 to 3000;
   (c) a diol extender; and
   (d) from 0.0005 to 0.05 equivalents, per equivalent of said isocyanate, of a monohydric aliphatic alcohol selected from the class consisting of dodecyl alcohol, stearyl alcohol and the monobutyl ether of diethylene glycol;

the ratio of isocyanate groups to hydroxyl groups being within the range of about 0.95:1 to about 1.10:1.

6. A thermoplastic polyurethane elastomer according to claim 5 wherein the polymeric diol is a polycaprolactone diol.

7. A thermoplastic polyurethane elastomer according to claim 5 wherein the polymeric diol is a polytetramethylene glycol.

8. A thermoplastic polyurethane elastomer according to claim 1 wherein the organic diisocyanate is 4,4'-methylenebis(phenyl isocyanate).

* * * * *